United States Patent
Yang et al.

(10) Patent No.: US 12,423,845 B2
(45) Date of Patent: Sep. 23, 2025

(54) METHOD FOR OBTAINING DEPTH IMAGES, ELECTRONIC DEVICE, AND STORAGE MEDIUM

(71) Applicant: HON HAI PRECISION INDUSTRY CO., LTD., New Taipei (TW)

(72) Inventors: Jung-Hao Yang, New Taipei (TW); Chin-Pin Kuo, New Taipei (TW); Chih-Te Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 503 days.

(21) Appl. No.: 17/897,568

(22) Filed: Aug. 29, 2022

(65) Prior Publication Data

US 2023/0419522 A1 Dec. 28, 2023

(30) Foreign Application Priority Data

Jun. 22, 2022 (CN) .......................... 202210716239.3

(51) Int. Cl.
| | | |
|---|---|---|
| G06K 9/00 | (2022.01) | |
| G06T 7/174 | (2017.01) | |
| G06T 7/579 | (2017.01) | |
| G06T 7/70 | (2017.01) | |

(52) U.S. Cl.
CPC .............. *G06T 7/579* (2017.01); *G06T 7/174* (2017.01); *G06T 7/70* (2017.01); *G06T 2207/10016* (2013.01); *G06T 2207/10028* (2013.01); *G06T 2207/20081* (2013.01); *G06T 2207/20084* (2013.01); *G06T 2207/30248* (2013.01)

(58) Field of Classification Search
None
See application file for complete search history.

(56) References Cited

U.S. PATENT DOCUMENTS 11,170,299 B2 * 11/2021 Kwon .................. G06V 10/763
2020/0211206 A1 * 7/2020 Wang ....................... G06N 3/08

FOREIGN PATENT DOCUMENTS

| CN | 109801337 | 5/2019 |
| CN | 111386550 | 7/2020 |

* cited by examiner

*Primary Examiner* — Wei Wen Yang
(74) *Attorney, Agent, or Firm* — ScienBiziP, P.C.

(57) ABSTRACT

A method for obtaining depth images implemented in an electronic device includes obtaining a first image and a second image; obtaining a predicted depth map of the first image, and calculating a first error value of the predicted depth map; determining a first transformation matrix between the first image and the second image; obtaining an instance segmentation image and obtaining a first mask image and a second mask image; obtaining a target transformation matrix; converting the predicted depth map into a first point cloud image, converting the first point cloud image into a second point cloud image, and converting the second point cloud image into a third image; calculating a second error value between the second image and the third image; obtaining a target deep learning network model; and inputting at least one image into the target deep learning network model, and obtaining at least one depth image.

17 Claims, 3 Drawing Sheets

METHOD FOR OBTAINING DEPTH IMAGES, ELECTRONIC DEVICE, AND STORAGE MEDIUM

FIELD

The subject matter herein generally relates to computer vision, and particularly to an electronic device, a method for obtaining depth images, and a storage medium.

BACKGROUND

Autonomous travelling technology is widely used, when a vehicle is automatically travelling, pedestrians, vehicles, or obstacles around the vehicle must be monitored at all times by capturing depth images, for distances to all obstacles. Depth images are usually obtained based on binocular vision, structured light, or time of flight (TOF). However, the depth images obtained based on above methods may be not accurate, which may affect the safety of the autonomous travelling.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
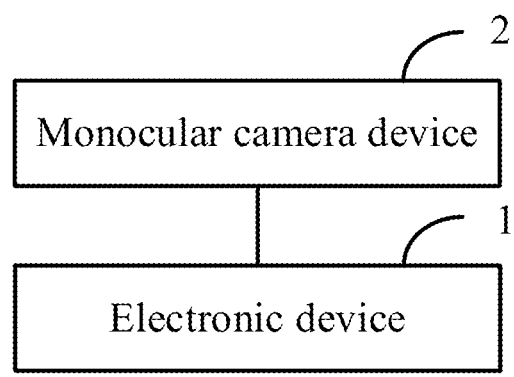
FIG. 1 is a schematic view of an embodiment of application environment of a method for obtaining depth images according to the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those skilled in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles so characterized do not exclude other elements or articles. The terms "connect", "link" or the like are not limited to physical or mechanical connection, but may include electrical connections, whether direct or indirect.

A neural network for depth estimation (i.e., depth estimation network) can be trained based on a large number of sample images taken by a camera device. The depth estimation network can estimate depth information of the image.

The training of depth estimation network can be unsupervised training. Unsupervised depth estimation training includes two categories of methods. one category of method estimates the image depth and the pose of the adjacent frames in the image set based on the image set taken by the monocular camera, remaps the image according to the image depth and pose, and guides the training of the network according to the error of the remapped image. The other category of method predicts the left-right consistency of the disparity map between the left and right binocular images in the image set based on the image set taken by the camera, learns the disparity map, and calculates the depth value according to the baseline and focal length of the camera.

However, the method based on the pose estimation may be easily affected by moving objects, the estimated pose may be inaccurate, and the calculation of the remapping error may be affected. The method based on binocular video requires an extra camera, which increases the calculation complexity. In addition, the calibration and correction accuracy of the left and right binocular cameras will also affect the accuracy of depth estimation.

Referring to FIG. 1, an electronic device 1 is illustrated. The electronic device 1 may be a vehicle-mounted personal computer, a server, etc., the server may be a single server, a server cluster, or the like.

A method for obtaining depth images is applied in at least one electronic device 1. The electronic device 1 communicates with a monocular camera device 2.

In one embodiment, the electronic device 1 can be in a wired network environment or in a wireless network environment. The wireless network can be radio, WI-FI, or cellular network. The cellular network can be a 4G network or a 5G network.

In one embodiment, the electronic device 1 may include at least one network device and/or at least one user device. The network device includes, but is not limited to, a single network server, a server group including a number of network servers, or cloud including a large number of hosts or web servers based on cloud computing.

Figure 2:
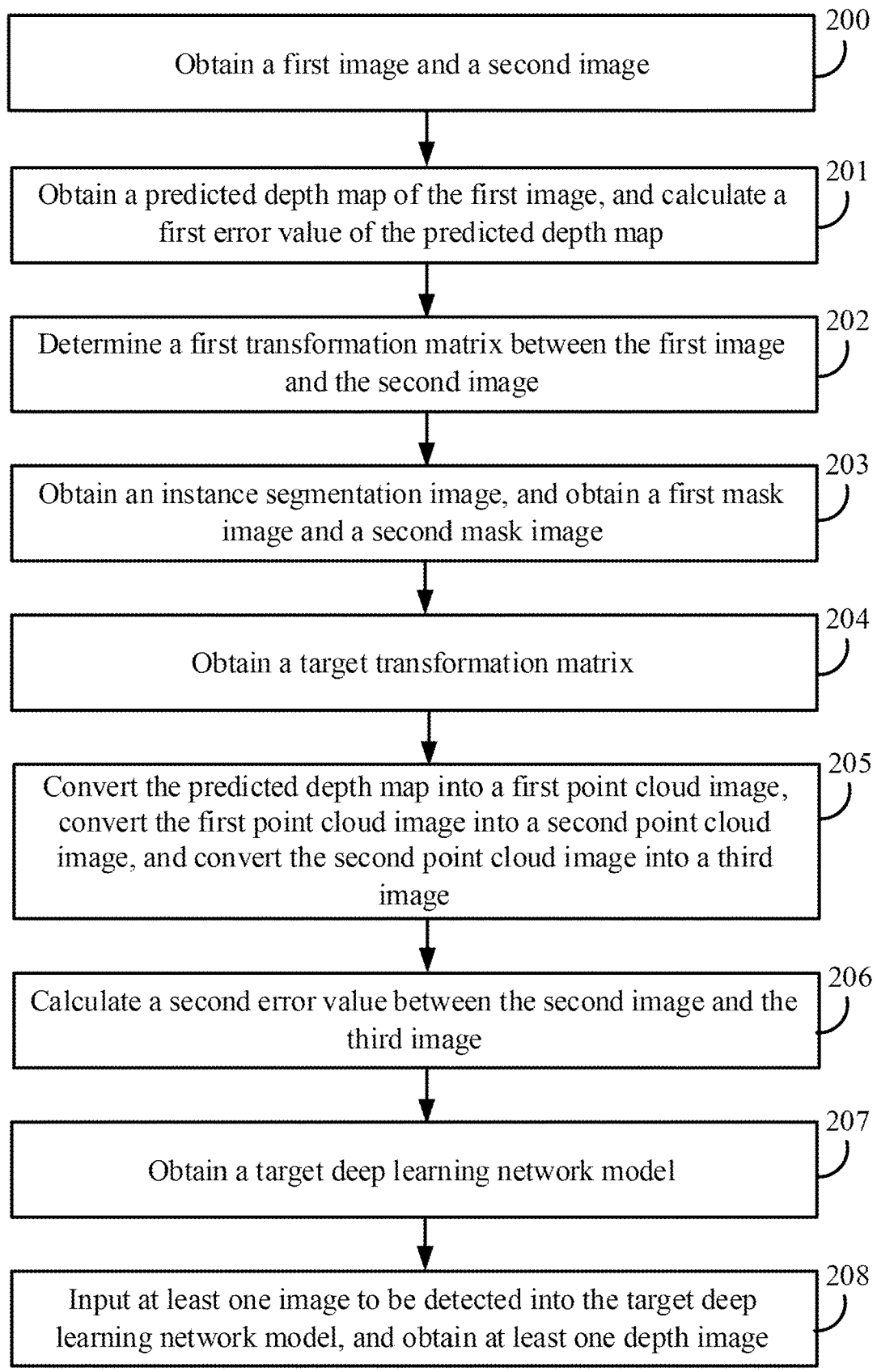
FIG. 2 illustrates a flowchart of an embodiment of a method for obtaining depth images according to the present disclosure.

FIG. 2 illustrates a flowchart of an embodiment of a method for obtaining depth images. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 200.

At block 200, obtaining a first image and a second image, the first image and the second image being adjacent frame images.

In one embodiment, the first image and the second image are captured by a camera device, and the camera device may be a monocular camera device. For example, the first image and the second image may be images captured by the monocular camera device during travelling of the vehicle.

In one embodiment, obtaining the first image and the second image further includes: recording a video of front view of the vehicle during travelling by the monocular camera device, and obtaining images of adjacent frames in the video by using OpenCV technology as the first image and the second image.

In one embodiment, the adjacent frame images include an image of previous frame image of the first image or an image of subsequent frame of the first image. For example, the first image is captured at time t, the second image may be the image captured at time t+1 or the image captured at time t−1.

At block 201, obtaining a predicted depth map of the first image based on a deep learning network model, and calculating a first error value of the predicted depth map by using a first preset loss function.

In one embodiment, the deep learning network model includes a depth estimation network and a pose estimation network.

In one embodiment, obtaining the predicted depth map of the first image based on a deep learning network model includes: obtaining the predicted depth map by processing the first image using the depth estimation network.

In one embodiment, the depth estimation network includes an input layer, a convolution layer, and a deconvolution layer. The first image is input into the input layer of the depth estimation network, the feature map of the first image is obtained by performing a convolution operation on the first image through the convolution layer of the depth estimation network, a first high-dimensional feature map is obtained by inputting the feature map into the deconvolution layer and performing a deconvolution operation on the feature map, each pixel point in the first high-dimensional feature map is mapped to a corresponding depth, and the predicted depth map is output.

In one embodiment, the first preset loss function is as follows:

$$L_1 = \sum_{i \in (x,y)} \left| \partial_i \left( \frac{1}{D_t(u,v)} \right) \right| e^{-\|\partial_i I_t(u,v)\|}, \quad \text{(formula (1))}$$

In formula (1), $L_1$ represents the first error value, $D_t(u, v)$ represents the pixel coordinates of the predicted depth map, and $I_t(u, v)$ represents the pixel coordinates of the first image.

At block 202, determining a first transformation matrix between the first image and the second image.

In one embodiment, determining a first transformation matrix between the first image and the second image includes: obtaining the first transformation matrix between the first image and the second image by processing the first image and the second image by using the pose estimation network.

In one embodiment, the pose estimation network includes an input layer and at least one convolution layer.

In one embodiment, the first image and the second image are input into the input layer of the pose estimation network, the feature maps of the first image and the second image are obtained by performing a convolution operation on the first image and the second image through the convolution layer of the pose estimation network, and a camera pose estimation algorithm is used to obtain a camera pose between the first image and the second image, that is, the camera pose is the first transformation matrix.

In one embodiment, the camera pose includes: a rotation matrix and a translation matrix, the rotation matrix and the translation matrix are represented by six degrees of freedom, the pixel coordinates of the first image can determine the corresponding pixel coordinates of the second image through the camera pose information.

In one embodiment, the first transformation matrix includes a transformation matrix for transforming each pixel point of the first image to a pixel point of the second image.

At block 203, performing an instance segmentation process on the first image, obtaining an instance segmentation image, performing a mask process on the instance segmentation image, and obtaining a first mask image and a second mask image.

In one embodiment, the instance segmentation image includes label information of the first image. For example, if the first image includes a vehicle, box information for indicating the vehicle is carried in the instance segmentation image.

In one embodiment, performing an instance segmentation process on the first image, obtaining an instance segmentation image includes: obtaining an output image by inputting the first image into a pre-trained instance segmentation model; based on the output image, detecting the segmentation accuracy of the instance segmentation model for segmenting the first image; if the segmentation accuracy is greater than a preset threshold, determining the output image to be the instance segmentation image.

In one embodiment, the instance segmentation model includes a feature extraction network layer, a feature mapping layer, a classification layer, and the like. The feature extraction network layer is used to extract feature information in the first image, and the feature extraction network layer may include a plurality of convolutional layers. The feature mapping layer is used to map the feature information of the same object into a feature map. For example, if the first image includes a pedestrian object and a vehicle object, the feature map obtained by the feature mapping layer includes the feature map of the pedestrian and the feature map of the vehicle. The classification layer is used to recognize the type of object in the feature map. The classification layer includes a fully connected layer.

The preset threshold may be a value preset according to actual requirements, for example, the preset threshold may be 90%.

The instance segmentation can be automatically performed on the images during travelling of the vehicle through the instance segmentation model, which can improve the generation efficiency of the output image. At the same time, by detecting the output image, the accuracy of instance segmentation image can be improved.

In one embodiment, detecting the segmentation accuracy of the instance segmentation model for segmenting the first image based on the output image includes: recognizing the position of the object where the label of the object is located in the first image, the object label is the label of the object in the first image. For example, the objects in the first image can include a dog, a vehicle, and a tree, 1 can be used to represent the dog, 2 to represent the vehicle, 3 to represent the tree, the object label corresponding to the dog is 1, the object label corresponding to the vehicle is 2, and the object label corresponding to the tree is 3; obtaining a predicted position corresponding to the object label from the output image; obtaining the segmentation accuracy by calculating a ratio of the difference between the predicted position and the actual position of the object to the actual position of the object.

The object position and the predicted position are analyzed through the same object label, so as to improve the calculation accuracy of the segmentation.

In one embodiment, performing a mask process on the instance segmentation image, and obtaining the first mask image and the second mask image includes: obtaining the first mask image by performing the mask process on all moving objects in the instance segmentation image; obtaining the second mask image by performing the mask process on all non-moving objects in the instance segmentation image.

In one embodiment, the instance segmentation image may include the objects such as roads, trees, pedestrians, vehicles, cyclists, and street lamps, the mask process is performed on the moving objects such as pedestrians, vehicles, and cyclists in the instance segmentation image, the first mask image is thus obtained, and the mask process is performed on the non-moving objects such as roads, trees, and street lamps in the instance segmentation image, the second mask image is thus obtained.

In one embodiment, the mask process includes assigning a value to a pixel value of a pixel point representing a moving object or a non-moving object. For example, the pixel values of the pixel points representing the moving object are assigned to be 0, and the pixel values of the pixel points representing the non-moving object are assigned to be 1 or 255. For example, the pixel values of the pixel points representing the moving object are assigned to be 0, and the pixel values of the pixel points representing other areas except the moving object are assigned to be 255.

At block 204, performing an averaging process on the first transformation matrix according to the first mask image and the second mask image, and obtaining a target transformation matrix.

In one embodiment, performing an averaging process on the first transformation matrix according to the first mask image and the second mask image, and obtaining a target transformation matrix includes: obtaining a second transformation matrix by performing the averaging process on the first transformation matrix based on the first mask image; obtaining a third transformation matrix by performing the averaging process on the first transformation matrix based on the second mask image; obtaining a target transformation matrix by adding the second transformation matrix and the third transformation matrix.

In one embodiment, obtaining a second transformation matrix by performing the averaging process on the first transformation matrix based on the first mask image includes: obtaining the number of pixel points of each moving object in the first mask image and the first transformation matrix corresponding to the pixel points of each moving object; obtaining the transformation matrix of each moving object by performing the averaging process on the first transformation matrix according to the number of pixel points of each moving object in the first mask image and the first transformation matrix, the transformation matrix corresponding to each moving object is the second transformation matrix.

For example, there are three moving objects in the first mask image, the three moving objects include a vehicle, a pedestrian, and a cat. The number of pixel points representing the vehicle is 100, the number of pixel points representing the pedestrian is 123, and the number of pixel points representing the cat is 114. The first transformation matrix corresponding to the pixel points representing the vehicle, the first transformation matrix corresponding to the pixel points representing the pedestrian, and the first transformation matrix corresponding to the pixel points representing the cat are obtained. All the first transformation matrices representing the pixel points of the vehicle are added to obtain an addition result, and the addition result is divided by the number of pixel points representing the vehicle to obtain the transformation matrix of the vehicle, and the transformation matrix of the vehicle is taken as the second transformation matrix. All the first transformation matrices representing the pixel points of the pedestrian are added to obtain an addition result, and the addition result is divided by the number of pixel points representing the pedestrian to obtain the transformation matrix of the pedestrian, and the transformation matrix of the pedestrian is taken as the second transformation matrix. All the first transformation matrices representing the pixel points of the cat are added to obtain an addition result, and the addition result is divided by the number of pixel points representing the cat to obtain the transformation matrix of the cat, and the transformation matrix of the cat is taken as the second transformation matrix.

In one embodiment, obtaining a third transformation matrix by performing the averaging process on the first transformation matrix based on the second mask image includes: obtaining the number of pixel points of each non-moving object in the second mask image and the first transformation matrix corresponding to the pixel points of each non-moving object; performing the averaging process on the first transformation matrix, according to the number of pixel points of each non-moving object and the first transformation matrix corresponding to the pixel points of each non-moving object, obtaining the transformation matrix of each non-moving object, and the transformation matrix of each non-moving object is taken as the third transformation matrix.

In one embodiment, obtaining the target transformation matrix by adding the second transformation matrix and the third transformation matrix includes: obtaining the target transformation matrix by adding the second transformation matrices of all moving objects and the third transformation matrices of all non-moving objects.

It can be understood that the transformation matrices of the pixels of all moving objects in the image and the transformation matrices of the pixels of all non-moving objects in the image are averaged, and finally the averaged transformation matrices are added. A more accurate transformation matrix is obtained, and a more accurate pose is obtained, thereby improving the accuracy of the depth estimation network training.

At block 205, converting the predicted depth map into a first point cloud image based on internal parameters of the camera device, converting the first point cloud image into a second point cloud image based on the target transformation matrix, and converting the second point cloud image into a third image.

In one embodiment, the first point cloud image and the second point cloud image are both three-dimensional (3D) point cloud images.

In one embodiment, converting the predicted depth map to the first point cloud image includes: converting the predicted depth map into the first point cloud image based on the internal parameters of the camera device and the predicted depth map.

In one embodiment, the predicted depth map is converted into a three-dimensional point cloud image according to the following formula:

$$D\begin{bmatrix} x_1 \\ y_1 \\ 1 \end{bmatrix} = KU; KU = \begin{bmatrix} f_x & 0 & c_x \\ 0 & f_y & c_y \\ 0 & 0 & 1 \end{bmatrix} \begin{bmatrix} x \\ y \\ z \end{bmatrix}. \quad (2)$$

In the formula (2), D represents the depth value of the predicted depth map, $(x_1, y_1)$ represents the pixel coordinate corresponding to the depth value in the predicted depth map, K represents the internal parameters of the camera device (i.e., monocular camera device 2), and U represents the coordinates (x, y, z) of the point in the first point cloud image.

In one embodiment, converting the first point cloud image to the second point cloud image based on the target transformation matrix includes: obtaining the coordinates of the points in the first point cloud image and combining the coordinates of the points into a coordinate set; obtaining the second point cloud image by multiplying the target transformation matrix by the coordinate set.

In one embodiment, converting the second point cloud image into the third image includes converting the second point cloud image into the third image by the following formula:

$$\begin{bmatrix} a \\ b \\ c \end{bmatrix} = K^{-1}c \begin{bmatrix} m \\ n \\ 1 \end{bmatrix}, \quad (3)$$

In the formula (3), (a, b, c) represents the coordinate of the point in the second point cloud image, $K^{-1}$ represents the inverse matrix of the K, and (m, n) represents the coordinate of the pixel in the third image.

At block 206, calculating a second error value between the second image and the third image by using a second preset loss function.

In one embodiment, the second preset loss function is as follows:

$$L_2 = (1-\alpha)|\hat{l}(u,v) - l(u,v)| + \alpha SSIM(\hat{l},l) \quad (4),$$

in the function (4), $L_2$ represents the second error value, α represents a constant, $\hat{l}(u, v)$ represents the pixel coordinate of the third image, and l(u, v) represents the pixel coordinate of the second image, SSIM (Structural Similarity index) is an index used to measure the similarity of two images.

At block 207, obtaining a target deep learning network model by adjusting the deep learning network model according to the first error value and the second error value.

In one embodiment, obtaining a target deep learning network model by adjusting the deep learning network model according to the first error value and the second error value includes: calculating a sum of the first error value and the second error value, obtaining a total training error value of the deep learning network model; adjusting configuration parameters of the deep learning network model until the total training error value does not decrease, and determining the target deep learning network model.

In one embodiment, the configuration parameters can be parameters of initialization configuration in the depth estimation network and the pose estimation network, for example, the configuration parameters include the number of layers of convolutional layers and deconvolutional layers in the depth estimation network and the size of the convolution kernel in the convolution layer and the deconvolution layer, and the configuration parameters also include the number of layers of the convolution layer in the pose estimation network and the size of the convolution kernel in the convolution layer.

At block 208, inputting at least one image to be detected into the target deep learning network model, and obtaining a depth image corresponding to each of the at least one image to be detected.

In one embodiment, the at least one image to be detected includes at least one image of a front view of an autonomous vehicle during travelling.

In one embodiment, the depth image corresponding to the image to be detected can be obtained by inputting the image to be detected into the target deep learning network model, which allows the depth image based on the monocular image to be obtained.

It can be seen from the above technical solutions that the present application obtains the predicted depth map of the adjacent frame images and the first transformation matrix between the adjacent frame images through the deep learning network model, and calculates the first error value of the predicted depth map, and then performs instance segmentation processing on the image, which can accurately segment moving objects and non-moving objects in the image, and mask the image after instance segmentation processing to obtain a more accurate description of the outline of an object, and then obtains the pixel representing the object and the number of pixels representing the object, and averages the first transformation matrix in the masked image to obtain a more accurate target transformation matrix, and converts the predicted depth map into the first point cloud image according to the camera's internal parameters. The target transformation matrix converts the first point cloud image into the second point cloud image, calculates the difference between the first point cloud image and the second point cloud image as the second error value, and makes adjustments based on the first error value and the second error value. A deep learning network model is obtained to function as a target deep learning network model. The deep learning network model is adjusted by the first error value and the second error value, thereby improving the accuracy and fineness of the depth image, so that the obtained depth image can be applied to the autonomous travelling of vehicles, it can ensure that autonomous travelling is safer.

Figure 3:
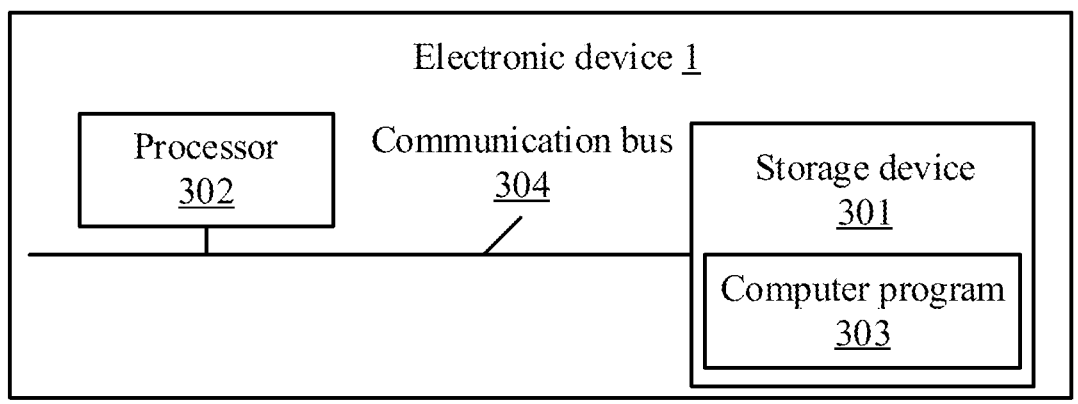
FIG. 3 is a block diagram of an embodiment of an electronic device according to the present disclosure.

FIG. 3 illustrates the electronic device 1 in one embodiment. The electronic device 1 includes, but is not limited to, a storage device 301, a processor 302, a computer program 303, and a communication bus 304. FIG. 3 illustrates only one example of the electronic device 1. Other examples can include more or fewer components than as illustrated or have a different configuration of the various components in other embodiments.

The processor 302 can be a central processing unit (CPU), a microprocessor, or other data processor chip that performs functions in the electronic device 1.

In one embodiment, the storage device 301 can include various types of non-transitory computer-readable storage mediums. For example, the storage device 301 can be an internal storage system, such as a flash memory, a random access memory (RAM) for the temporary storage of information, and/or a read-only memory (ROM) for permanent storage of information. The storage device 301 can also be an external storage system, such as a hard disk, a storage card, or a data storage medium.

The storage device 301 stores instructions, the processor 302 executes the computer program 30 stored in the storage device 301 for implementing the method for processing images provided in the embodiments of the present disclosure. The computer program 303 can be a depth image obtaining program and include instructions.

Upon execution of the instructions stores in the storage device 301, the processor 302 is configured to:

obtain a first image and a second image, the first image and the second image are adjacent frame images;

obtain a predicted depth map of the first image based on a deep learning network model, and calculate a first error value of the predicted depth map by using a first preset loss function;

determine a first transformation matrix between the first image and the second image;

obtain an instance segmentation image by performing an instance segmentation process on the first image, and obtain a first mask image and a second mask image by performing a mask process on the instance segmentation image;

obtain a target transformation matrix by performing an averaging process on the first transformation matrix according to the first mask image and the second mask image;

convert the predicted depth map into a first point cloud image based on the internal parameters of the camera device, convert the first point cloud image into a second point cloud image based on the target transformation matrix, and convert the second point cloud image into a third image;

calculate a second error value between the second image and the third image by using a second preset loss function;

obtain a target deep learning network model by adjusting the deep learning network model according to the first error value and the second error value; and input at least one image to be detected into the target deep learning network model, and obtain at least one depth image of the at least one image to be detected.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for obtaining depth images implemented in an electronic device comprising:

obtaining a first image and a second image, the first image and the second image being adjacent frame images;

obtaining a predicted depth map of the first image based on a deep learning network model, and calculating a first error value of the predicted depth map by using a first preset loss function;

determining a first transformation matrix between the first image and the second image;

obtaining an instance segmentation image by performing an instance segmentation process on the first image, and obtaining a first mask image and a second mask image by performing a mask process on the instance segmentation image;

obtaining a target transformation matrix by performing an averaging process on the first transformation matrix according to the first mask image and the second mask image;

obtaining a second transformation matrix by performing the averaging process on the first transformation matrix based on the first mask image;

obtaining a third transformation matrix by perform the averaging process on the first transformation matrix based on the second mask image;

obtaining a target transformation matrix by adding the second transformation matrix and the third transformation matrix;

converting the predicted depth map into a first point cloud image based on internal parameters of a camera device, converting the first point cloud image into a second point cloud image based on the target transformation matrix, and converting the second point cloud image into a third image;

calculating a second error value between the second image and the third image by using a second preset loss function;

obtaining a target deep learning network model by adjusting the deep learning network model according to the first error value and the second error value; and inputting the image to be detected into the target deep learning network model, and obtaining a depth image of the image to be detected.

2. The method according to claim 1, wherein obtaining a first mask image and a second mask image by performing a mask process on the instance segmentation image comprises:

obtaining the first mask image by performing the mask process on all moving objects in the instance segmentation image; and obtaining the second mask image by performing the mask process on all non-moving objects in the instance segmentation image.

3. The method according to claim 1, wherein obtaining a second transformation matrix by performing the averaging process on the first transformation matrix based on the first mask image comprises:

obtaining a number of pixels of each moving object in the first mask image and the first transformation matrix corresponding to the pixels of each moving object; and obtaining the transformation matrix of each moving object by performing the averaging process on the first transformation matrix according to the number of pixels of each moving object in the first mask image and the first transformation matrix.

4. The method according to claim 1, wherein the deep learning network model includes a depth estimation network and a pose estimation network, obtaining the predicted depth map of the first image based on a deep learning network model comprises:

obtaining the predicted depth map by performing convolution and deconvolution operation on the first image through the depth estimation network.

5. The method according to claim 4, wherein determining a first transformation matrix between the first image and the second image comprises:

obtaining the first transformation matrix between the first image and the second image by performing convolution operation on the first image and the second image through the pose estimation network.

6. The method according to claim 1, wherein obtaining an instance segmentation image by performing an instance segmentation process on the first image comprises:
   obtaining an output image by inputting the first image into a pre-trained instance segmentation model;
   detecting, based on the output image, segmentation accuracy of the instance segmentation model for the first image; and
   in response that the segmentation accuracy is greater than a preset threshold, determining the output image to be the instance segmentation image.

7. The method according to claim 1, wherein converting the predicted depth map into a first point cloud image based on internal parameters of a camera device comprises:
   converting the predicted depth map into a first point cloud image according to the following formula:

$$D \begin{bmatrix} x_1 \\ y_1 \\ 1 \end{bmatrix} = KU; KU = \begin{bmatrix} f_x & 0 & c_x \\ 0 & f_y & c_y \\ 0 & 0 & 1 \end{bmatrix} \begin{bmatrix} x \\ y \\ z \end{bmatrix},$$

in which, D represents the depth value of the depth image, $(x_1, y_1)$ represents the pixel coordinates corresponding to the depth value in the depth image, K represents the internal parameters of the camera, U represents the coordinates (x, y, z) of the point in the first point cloud image.

8. An electronic device comprising:
   at least one processor; and
   a storage device coupled to the at least one processor and storing instructions for execution by the at least one processor to cause the at least one processor to:
   obtain a first image and a second image, the first image and the second image are adjacent frame images;
   obtain a predicted depth map of the first image based on a deep learning network model, and calculate a first error value of the predicted depth map by using a first preset loss function;
   determine a first transformation matrix between the first image and the second image;
   obtain an instance segmentation image by performing an instance segmentation process on the first image, and obtain a first mask image and a second mask image by performing a mask process on the instance segmentation image;
   obtain a target transformation matrix by performing an averaging process on the first transformation matrix according to the first mask image and the second mask image;
   obtain a second transformation matrix by performing the averaging process on the first transformation matrix based on the first mask image;
   obtain a third transformation matrix by perform the averaging process on the first transformation matrix based on the second mask image;
   obtain a target transformation matrix by adding the second transformation matrix and the third transformation matrix;
   convert the predicted depth map into a first point cloud image based on internal parameters of a camera device, convert the first point cloud image into a second point cloud image based on the target transformation matrix, and convert the second point cloud image into a third image;
   calculate a second error value between the second image and the third image by using a second preset loss function;
   obtain a target deep learning network model by adjusting the deep learning network model according to the first error value and the second error value; and
   input the image to be detected into the target deep learning network model, and obtain a depth image of the image to be detected.

9. The electronic device according to claim 8, wherein the at least one processor is further caused to:
   obtain the first mask image by performing the mask process on all moving objects in the instance segmentation image; and
   obtain the second mask image by performing the mask process on all non-moving objects in the instance segmentation image.

10. The electronic device according to claim 8, wherein the at least one processor is further caused to:
    obtain a number of pixels of each moving object in the first mask image and the first transformation matrix corresponding to the pixels of each moving object; and
    obtain the transformation matrix of each moving object by performing the averaging process on the first transformation matrix according to the number of pixels of each moving object in the first mask image and the first transformation matrix.

11. The electronic device according to claim 8, wherein the deep learning network model includes a depth estimation network and a pose estimation network, the at least one processor is further caused to:
    obtain the predicted depth map by performing convolution and deconvolution operation on the first image through the depth estimation network.

12. The electronic device according to claim 11, wherein the at least one processor is further caused to:
    obtain the first transformation matrix between the first image and the second image by performing convolution operation on the first image and the second image through the pose estimation network.

13. The electronic device according to claim 8, wherein the at least one processor is further caused to:
    obtain an output image by inputting the first image into a pre-trained instance segmentation model;
    detect, based on the output image, segmentation accuracy of the instance segmentation model for the first image; and
    in response that the segmentation accuracy is greater than a preset threshold, determine the output image to be the instance segmentation image.

14. The electronic device according to claim 8, wherein the at least one processor is further caused to:
    convert the predicted depth map into a first point cloud image according to the following formula:

$$D \begin{bmatrix} x_1 \\ y_1 \\ 1 \end{bmatrix} = KU; KU = \begin{bmatrix} f_x & 0 & c_x \\ 0 & f_y & c_y \\ 0 & 0 & 1 \end{bmatrix} \begin{bmatrix} x \\ y \\ z \end{bmatrix},$$

in which, D represents the depth value of the depth image, $(x_1, y_1)$ represents the pixel coordinates corresponding to the depth value in the depth image, K represents the internal parameters of the camera, U represents the coordinates (x, y, z) of the point in the first point cloud image.

15. A non-transitory computer-readable storage medium having instructions stored thereon, when the instructions are executed by a processor of an electronic device, the processor is configured to perform a method for obtaining depth images, wherein the method comprises:

obtaining a first image and a second image, the first image and the second image being adjacent frame images;

obtaining a predicted depth map of the first image based on a deep learning network model, and calculating a first error value of the predicted depth map by using a first preset loss function;

determining a first transformation matrix between the first image and the second image;

obtaining an instance segmentation image by performing an instance segmentation process on the first image, and obtaining a first mask image and a second mask image by performing a mask process on the instance segmentation image;

obtaining a target transformation matrix by performing an averaging process on the first transformation matrix according to the first mask image and the second mask image;

obtaining a second transformation matrix by performing the averaging process on the first transformation matrix based on the first mask image;

obtaining a third transformation matrix by perform the averaging process on the first transformation matrix based on the second mask image;

obtaining a target transformation matrix by adding the second transformation matrix and the third transformation matrix;

converting the predicted depth map into a first point cloud image based on internal parameters of a camera device, converting the first point cloud image into a second point cloud image based on the target transformation matrix, and converting the second point cloud image into a third image;

calculating a second error value between the second image and the third image by using a second preset loss function;

obtaining a target deep learning network model by adjusting the deep learning network model according to the first error value and the second error value; and inputting the image to be detected into the target deep learning network model, and obtaining a depth image of the image to be detected.

16. The non-transitory computer-readable storage medium according to claim 15, wherein obtaining a first mask image and a second mask image by performing a mask process on the instance segmentation image comprises:

obtaining the first mask image by performing the mask process on all moving objects in the instance segmentation image; and obtaining the second mask image by performing the mask process on all non-moving objects in the instance segmentation image.

17. The non-transitory computer-readable storage medium according to claim 15, wherein obtaining a second transformation matrix by performing the averaging process on the first transformation matrix based on the first mask image comprises:

obtaining a number of pixels of each moving object in the first mask image and the first transformation matrix corresponding to the pixels of each moving object; and obtaining the transformation matrix of each moving object by performing the averaging process on the first transformation matrix according to the number of pixels of each moving object in the first mask image and the first transformation matrix.

* * * * *